2,799,631

PROCESS OF RECOVERING HYDRAZINE

Frederick Von Hessert, West Orange, and Calman J. Kish, North Plainfield, N. J., assignors to Fairmount Chemical Co., Inc., a corporation of New Jersey No Drawing. Application October 7, 1952, Serial No. 313,605

18 Claims. (Cl. 202—74)

The present invention relates to processes for recovering hydrazine and it particularly relates to a process of recovering hydrazine at relatively high concentration at low cost.

Hydrazine is prepared by the oxidation of ammonia or of urea with hypochlorites. The resulting reaction mixture contains the hydrazine in a relatively weak aqueous solution, together with a considerable amount of inorganic salts, principally sodium chloride, sodium hydroxide and sodium carbonate.

To recover the hydrazine a distillation and evaporation process is employed, distilling off the dilute hydrazine and water, while the salts remain behind and accumulate in the distillation vessel.

The vapor equilibrium of hydrazine is such that the hydrazine must be considerably concentrated or fortified in the liquid phase before it will distill over and appear in the gaseous phase in sufficient strength for complete removal.

This entails a considerable expenditure of materials, labor and power and a substantial amount of hydrazine must be retained in the distillation vessel in order to build up the equilibrium liquor.

A loss in hydrazine results from prolonged heating of an equilibrium mixture containing substantial quantities of hydrazine, since hydrazine will gradually decompose under these conditions.

In addition, the solids which have to be removed from the boiling mixtures entrain substantial amounts of liquids containing hydrazine, necessitating washing and reconcentrating operations, greatly adding to the recovery cost and further decreasing the overall yield.

It is among the objects of the present invention to provide a novel hydrazine recovery procedure in which the hydrazine may be recovered in relatively high yield at low cost, with the elimination of the necessity of concentrating hydrazine in the initial reaction liquors together with the by-product salts, and without the need for prolonged washing of the salts after being separated from these liquors and of reconcentrating a considerable amount of wash liquors for recovery of entrained hydrazine.

Another object of the present invention is to provide for the rapid effective and low cost recovery and concentration of hydrazine from dilute ammonia and urea oxidation reaction mixtures with a minimum of washing and reconcentrating operations.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

It has been found that hydrazine may most readily be recovered from the crude oxidation reaction mixtures by flowing or passing such salt-containing solutions containing relatively dilute hydrazine into a concentrated aqueous alkali metal hydroxide distillation mixture maintained at a temperature range of about 125° C. to 150° C.

When the incoming salt-containing hydrazine solution flows into the distillation mixture, the hydrazine together with water vapor will flash off, leaving the salts. These salts will separate as crystalline solids.

These solids may then be removed from the distillation mixture continuously or intermittently by filtration, centrifugal separation or sedimentation.

The aqueous alkali metal hydroxide distillation mixture most readily used is a caustic soda solution containing 30% to 50% sodium hydroxide. However, a similar caustic potash solution or a caustic soda/caustic potash mixture may be also used to provide a flash off boiling range of 125° C. to 150° C.

The hydrazine with accompanying water vapors flashed off in this process may thereafter be concentrated further by rectification nad distillation. This treatment assures rapid and effective removal of substantially the entire yield of hydrazine from the reaction mixture, simultaneously separating the salts resulting from the oxidation reaction, thereby avoiding the prolonged heating accompanied by decomposition and lower yield.

Although the present invention is also applicable to the recovery of hydrazine produced by oxidizing ammonia with sodium hypochlorite, it will be particularly described in its application to the recovery of hydrazine from salt-containing reaction mixtures resulting from the oxidation of urea with sodium hypochlorite.

For example, by oxidizing urea with sodium hypochlorite, a relatively dilute salt-containing hydrazine solution is obtained, containing 1% to 3% of hydrazine. This dilute solution of hydrazine, together with the salts and other compounds which are produced by the oxidation of urea, is passed into an aqueous 30% to 50% caustic soda distillation mixture maintained boiling at a temperature of 125° to 150° C. Temperatures up to 160° to 170° C. may be used but are not preferred.

This will cause a flash-off of the entire hydrazine together with water vapors, leaving the salts. This procedure may be continued until the accumulation of salts in the distillation mixture necessitates a periodic removal and separation of the salts from the distillation mixture.

Desirably, the distillation mixture is maintained at constant level and as the salts resulting from the oxidation liquor accumulate in the distillation mixture, the caustic alkali mixture may be removed and the salts then blown with air to remove any residual sodium hydroxide or caustic solution.

The salts remaining after being blown with air will consist of a mixture of sodium chloride and sodium carbonate, without containing any appreciable liquids, and this salt combination may be discarded by either dissolving it out of the separating vessel or removing and centrifuging it to eliminate completely any adhering solution.

Then the caustic liquid is passed back into the boiler and the process is repeated until the salts again have accumulated and have to be removed.

This procedure may be repeated with removal of salt, and it is not necessary at any time to recover any hydrazine from the salt residue in spite of the high viscosity and viscous character of the concentrated caustic solution, since the hydrazine will have been removed completely from the liquid phase.

Surprisingly by a simple air blowing operation, it is possible to remove almost all of the residual caustic soda solution from the salts which have accumulated in the boiling caustic liquor, and it is not necessary to wash said salts.

The boiling caustic soda solution of 30% to 50% concentration will assure substantially complete recovery of the hydrazine from the oxidation reaction mixture.

To maintain the temperature of the boiling mixture it has been found most satisfactory to circulate a portion of the boiling mixture through a heat exchanger to create the boiling conditions and to assure a boiling temperature of 125° to 150° C.

Usually the oxidation reaction mixture obtained by reacting urea with sodium hypochlorite will contain about 50 parts of water, 10 parts of caustic soda, 20 parts of sodium carbonate, 30 parts of sodium chloride and 1 to 4 parts of hydrazine, all parts being by weight.

The reaction mixture from the sodium hypochlorite-ammonia reaction will contain 60 to 75 parts of water, 15 to 25 parts of sodium chloride, 1 to 2 parts of caustic soda and ½ to 2 parts of hydrazine, all by weight.

In the ammonia reaction mixture, the amount of caustic soda is much smaller and there is practically no sodium carbonate.

Desirably, the salts are permitted to concentrate upon a double bottom salt separator screen, so that they may be readily removed and blown with air or removed and centrifuged.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A process of recovering hydrazine from a reaction mixture containing the same, said reaction mixture being a urea-sodium hypochlorite reaction mixture containing about 50 parts of water, 10 parts of caustic soda, 20 parts of sodium carbonate, 30 parts of sodium chloride and 1 to 4 parts of hydrazine, which comprises flowing such mixture into a boiling aqueous caustic solution at a temperature of 125° C. to 150° C. and flashing off and recovering the hydrazine.

2. The process of claim 1, said solution consisting of 30% to 50% caustic concentration.

3. The process of claim 1, said solution being a concentrated caustic soda solution.

4. A process of recovering hydrazine from a reaction mixture containing the same, said reaction mixture being a urea-sodium hypochlorite reaction mixture containing about 50 parts of water, 10 parts of caustic soda, 20 parts of sodium carbonate, 30 parts of sodium chloride and 1 to 4 parts of hydrazine, which comprises flowing such mixture into a boiling aqueous caustic solution at a temperature of 125° C. to 150° C. and flashing off and recovering the hydrazine and periodically removing residual salts from the boiling solution.

5. A process of recovering hydrazine from a reaction mixture containing the same, said reaction mixture being an ammonia-sodium hypochlorite reaction mixture containing about 60 to 75 parts of water, 15 to 25 parts of sodium chloride, 1 to 2 parts of caustic soda and ½ to 2 parts of hydrazine, which comprises flowing such mixture into a boiling aqueous caustic solution at a temperature of 125° C. to 150° C. and flashing off and recovering the hydrazine.

6. The process of claim 5, said solution consisting of 30% to 50% caustic concentration.

7. The process of claim 5, said solution being a concentrated caustic soda solution.

8. A process of recovering hydrazine from a reaction mixture containing the same, said reaction mixture being an ammonia-sodium hypochlorite reaction mixture containing 60 to 75 parts of water, 15 to 25 parts of sodium chloride, 1 to 2 parts of caustic soda and ½ to 2 parts of hydrazine, which comprises flowing such mixture into a boiling aqueous caustic solution at a temperature of 125° C. to 150° C. and flashing off and recovering the hydrazine and periodically removing residual salts from the boiling solution.

9. A method of recovering hydrazine from dilute salt-containing oxidation reaction liquors containing 1 to 3% hydrazine, said reaction liquors being produced by oxidizing ammonia and urea with hypochlorite, which comprises adding such liquors to an aqueous distillation boiling caustic soda mixture maintained at a temperature of 125° C. to 175° C. and recovering the hydrazine vapors.

10. A method of recovering hydrazine from dilute salt-containing oxidation reaction liquors containing 1 to 3% hydrazine, said reaction liquors being produced by oxidizing ammonia and urea with hypochlorite, which comprises adding such liquors to a boiling aqueous caustic mixture having a temperature of 125° C. to 175° C. and recovering the hydrazine vapors.

11. A method of recovering hydrazine from dilute salt-containing oxidation reaction liquors containing 1 to 3% hydrazine, said reaction liquors being produced by oxidizing ammonia and urea with hypochlorite, which comprises adding such liquors to an aqueous boiling caustic soda mixture and recovering the hydrazine vapors, said bath having a boiling temperature of 125° C. to 150° C.

12. A method of recovering hydrazine from aqueous oxidation reaction mixtures, said mixtures being produced by oxidizing ammonia and urea with a hypochlorite, which comprises adding such mixtures containing 1 to 3% of hydrazine to a boiling aqueous caustic solution having a temperature of 125° C. to 175° C. and recovering the hydrazine vapors, and removing the accumulation of salts from the boiling caustic mixture.

13. A method of recovering hydrazine from aqueous oxidation reaction mixtures, said mixtures being produced by oxidizing ammonia and urea with a hypochlorite, which comprises adding such mixtures containing 1 to 3% of hydrazine to a boiling caustic soda solution having a temperature of 125° C. to 150° C. and recovering the hydrazine vapors.

14. A method of recovering hydrazine from a urea oxidation reaction mixture, said mixture being produced by oxidizing urea with sodium hypochlorite, which comprises adding the reaction liquor containing 1 to 3% of hydrazine to a boiling caustic solution having a temperature of 125° C. to 150° C. and recovering the flashed-off hydrazine.

15. A process of recovering hydrazine which comprises flowing a dilute solution of 1 to 3% hydrazine into a boiling aqueous caustic soda solution of 30 to 50% concentration and having a temperature of 125° C. to 170° C. and recovering hydrazine from the vapors which are emitted.

16. A process of concentrating hydrazine from a mixture containing 60 to 75 parts of water, 15 to 20 parts of sodium chloride, 1 to 2 parts of caustic soda and ½ to 2 parts of hydrazine, all by weight, which comprises flowing this mixture into boiling caustic aqueous alkali and removing hydrazine from the vapors which are given off.

17. A process of recovering hydrazine from dilute aqueous 1 to 3% hydrazine solutions which comprises passing the dilute hydrazine into hot concentrated aqueous caustic alkali at a temperature of 125 to 170° C. and recovering hydrazine from the vapors.

18. A process of removing inorganic non-volatile water-soluble materials from dilute hydrazine solutions containing 1 to 3% of hydrazine which comprises flowing such solutions into hot boiling concentrated caustic alkali containing 30 to 50% of the alkali and being maintained at 125 to 150° C. and thus separating the hydrazine from the non-volatile water-soluble materials.

(References on following page)

References Cited in the file of this patent

UNITED STATES PATENTS

| | | |
|---|---|---|
| 422,334 | Curtius | Feb. 25, 1890 |
| 1,959,503 | Seuffert et al. | May 22, 1934 |
| 2,315,423 | Hildebrandt | Mar. 30, 1943 |
| 2,341,229 | Mueller-Cunradi | Feb. 8, 1944 |
| 2,470,206 | Archibald | May 17, 1949 |
| 2,529,209 | Ayo et al. | Nov. 7, 1950 |
| 2,591,735 | Solomon | Apr. 8, 1952 |
| 2,690,378 | Penneman | Sept. 28, 1954 |

FOREIGN PATENTS

| | | |
|---|---|---|
| 494,344 | Great Britain | Oct. 25, 1938 |
| 509,299 | Belgium | Mar. 12, 1952 |

OTHER REFERENCES

Audrieth et al.: "The Chemistry of Hydrazine," Chemical and Engineering News, vol. 26, No. 50, Dec. 13, 1948, pp. 3746–3749.

"Fairmount Plans 40% Slash in Price of Hydrazine," Chemical Engineering News, March 2, 1953, pp. 880–882.

Journal of Amer. Chem. Soc., vol. 33, pp. 1071–1076, article by Hale and Shatterly.